US006863017B2

(12) United States Patent
Charles et al.

(10) Patent No.: US 6,863,017 B2
(45) Date of Patent: Mar. 8, 2005

(54) SAFETY SEAT FOR A MARINE CRAFT OR OTHER VEHICLE

(76) Inventors: David Charles, 9284 SE. Cove Point St., Jupiter, FL (US) 33469; Jose Abella, 1030 NE. 196 St., North Miami, FL (US) 33161

( * ) Notice: Subject to any disclaimer, the term of this patent is extended or adjusted under 35 U.S.C. 154(b) by 0 days.

(21) Appl. No.: 10/389,698

(22) Filed: Mar. 14, 2003

(65) Prior Publication Data

US 2004/0177798 A1 Sep. 16, 2004

(51) Int. Cl.[7] .............................................. B63B 17/00
(52) U.S. Cl. .................... 114/363; 267/131; 297/314
(58) Field of Search ................................ 114/363, 191, 114/194; 267/131; 297/312, 314, 344.1

(56) References Cited

U.S. PATENT DOCUMENTS

| 2,132,291 | A | * | 10/1938 | Fitos ............................ 248/583 |
| 3,736,020 | A | * | 5/1973 | Pilachowski et al. .......... 296/63 |
| 4,401,290 | A | * | 8/1983 | Butler ........................... 248/565 |
| 5,219,203 | A | * | 6/1993 | Switlik .................... 297/216.11 |
| 5,309,861 | A | * | 5/1994 | Mardikian .................... 114/363 |
| 5,524,967 | A | * | 6/1996 | Glockl .......................... 297/314 |
| 5,639,059 | A | * | 6/1997 | Nash ............................ 248/619 |
| 5,993,276 | A | * | 11/1999 | Ponton et al. ............... 441/130 |
| 6,019,054 | A | * | 2/2000 | Hattori et al. ............ 114/55.57 |
| 6,042,093 | A | * | 3/2000 | Garelick ....................... 267/131 |
| 6,257,663 | B1 | * | 7/2001 | Swierczewski ......... 297/216.19 |
| 6,394,867 | B1 | * | 5/2002 | Bianco ......................... 441/126 |
| 6,688,554 | B2 | * | 2/2004 | Weekly .................... 244/118.5 |

* cited by examiner

Primary Examiner—Andrew D. Wright
(74) Attorney, Agent, or Firm—Malloy & Malloy, PA

(57) ABSTRACT

A safety seat assembly including a seat or like occupant support structured to maintain an occupant, such as a child or infant, in a predetermined, substantially upright orientation relative to the vehicle during travel thereof. A stabilization assembly includes an orientation portion moveable with the vehicle relative to the occupant support throughout a substantially universal range of orientations so as to compensate for any movement of the vehicle including lateral sway, turning, acceleration, de-acceleration, etc, which would tend to displace the occupant and occupant support from the preferred orientation. In one embodiment, the occupant support includes a floatation assembly as well as a ballast structure, wherein the occupant support is removably mounted on a water craft and is structured to maintain an occupant in an above surface, floating orientation in the water in the event of an emergency.

50 Claims, 14 Drawing Sheets

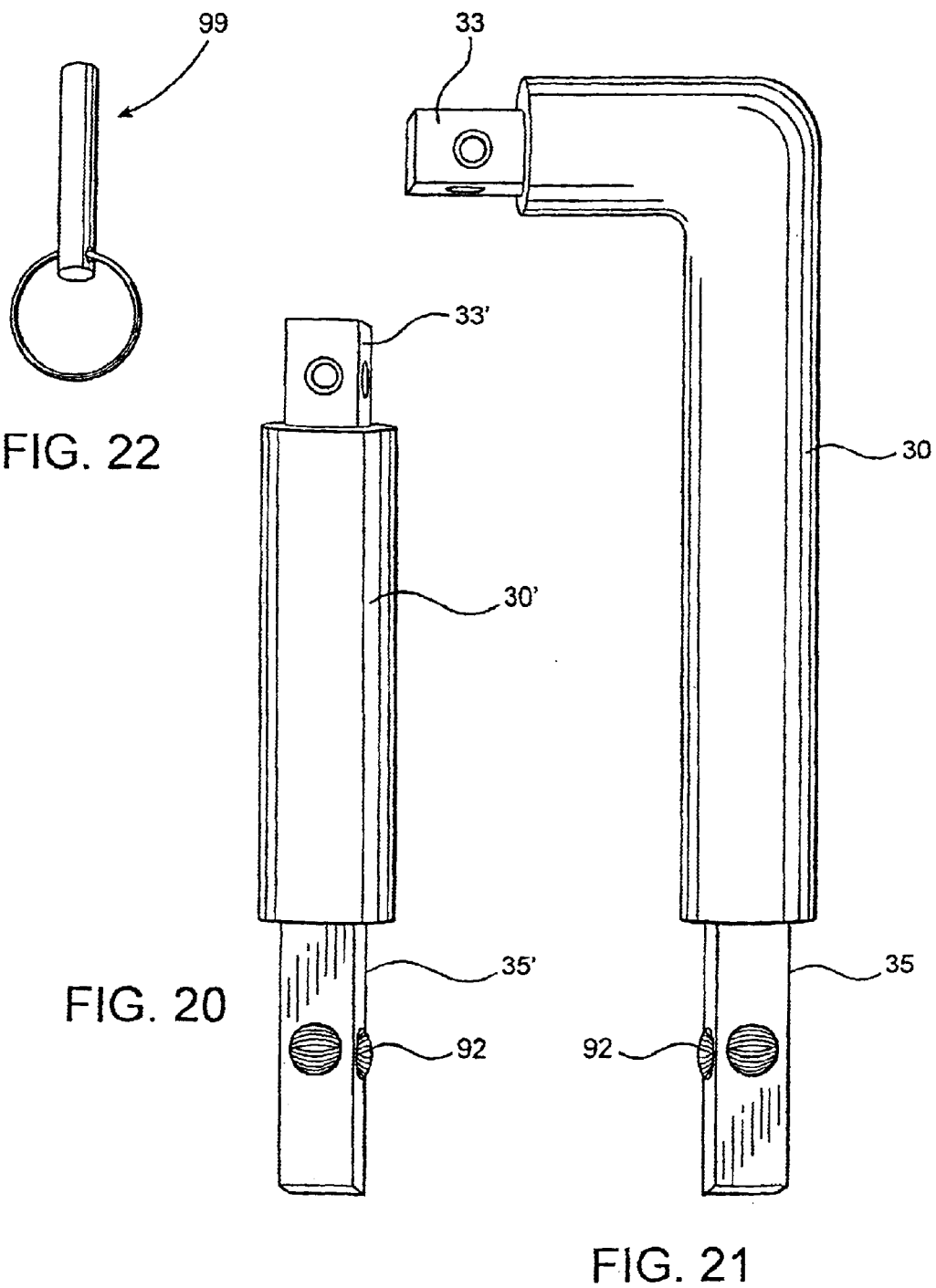

SAFETY SEAT FOR A MARINE CRAFT OR OTHER VEHICLE

BACKGROUND OF THE INVENTION

1. Field of the Invention

The present invention relates to a safety seat assembly including an occupant support structure particularly, but not exclusively, intended for use in maintaining a child on a marine craft or other type of vehicle. An included stabilization assembly is structured to overcome forces to which the occupant support is exposed, while maintaining the occupant in a preferred, substantially upright orientation regardless of the extreme movements of the vehicle during its travel. A floatation assembly may also be included to maintain the occupant in an above surface, floating position when placed in the water during an emergency situation.

2. Description of the Related Art

The use of child safety seats is universally recognized as an important and even necessary accessory for protecting children and infants traveling in motor vehicles. Moreover, use of some type of supporting seat assembly for children is mandated by either state or local regulations. As such, relatively sophisticated structural advancements have been made in the design and operative features of child safety seats in an effort to better protect a child occupant against trauma in emergency situations. In addition, such advancements are also directed to the use of lightweight, high strength materials which not only serve to protect an infant but facilitate the installation and removal of the safety seat from an intended location within a motor vehicle.

In spite of the various improvements found in modern day, commercially available child safety seats, the basic function thereof is to at least partially enclose and thereby protect the occupant against forcible trauma. In addition a common goal of such devices is to retain the child within the vehicle, typically through the use of various types of restraining harness and like devices. However, even in light of the widespread use and availability of child safety seats, they are not normally designed and structured to maintain the child in a predetermined orientation during unusual or extreme movements of the vehicle during travel, except of course when the vehicle is involved in a collision. By way of example, when an automobile or like motor vehicle is involved in a sharp turn at relatively high speeds, the safety seat and child occupant is subjected to relatively strong lateral forces which tend to displace the occupant from an intended comfortable and protected position. Similar forces are exerted on the seat structure and child occupant during deceleration as well as unusual acceleration of the vehicle. During such relatively extreme movements of the vehicle, conventional safety seats do not normally adapt to the tendency of the seat and occupant to be displaced from a preferred, normally intended orientation.

Another category of vehicles for which known or conventional child safety seats are generally considered to be unsatisfactory is marine craft. More specifically, it is of course known to include various floatation devices on pleasure boats as well as other water craft. As such, floatation devices are available which are specifically designed for infants and small children. However, there is a general lack of product development in the area of child safety seats or occupant supporting structures specifically intended to protect a child on a marine craft, which are also capable of maintaining an occupant in an above surface, floating position in an emergency situation.

It is acknowledged that safety seats or like supporting structures incorporating some type of floatation assembly are known. However, such devices typically lack sufficient structural versatility to include the operative features of absorbing shock in emergency situations while maintaining the child occupant in a preferred orientation during unusual movements of the water craft, such as during harsh weather conditions, high speed turns or other unusual maneuvers. Of course it is well recognized that relatively small boats encounter numerous conditions while traveling which exert lateral or swaying forces on the water craft. Such forces are transferred to the occupants, requiring the use of restraint devices or necessitating that the occupants brace themselves. Obviously, small children and infants normally would not have the strength or the foresight to assume a restraining position or take other protective measures during unusual maneuvering or other conditions which would effect the swaying, tilting, etc. of the boat.

Therefore there is a need in the area of child safety for a seat or other occupant support structure capable of protecting an occupant, regardless of age, against forcible trauma, while simultaneously maintaining the occupant in a preferred, substantially upright position normally assumed by an occupant when traveling in a vehicle. In addition such a device should be adaptable for use on a marine craft so as to protect a child occupant against drowning during emergency conditions.

SUMMARY OF THE INVENTION

The present invention is directed to a safety seat assembly comprising, in at least one preferred embodiment, structure which makes the seat assembly readily adaptable for use on a marine craft. As will be apparent hereinafter, the safety seat assembly of the present invention is primarily, but not exclusively, intended for use by infants and children. However, the present invention could be readily adapted, with little or no structural modification, for use in safely supporting and retaining occupants of a water craft, regardless of the age and/or stature thereof. As will also be apparent from the description of one or more preferred embodiments of the present invention, as hereinafter described, the term "seat" is used synonymously with other types of occupant support structures or retaining assemblies used to properly position and orient an occupant on a water craft or other type motor vehicle. Moreover, it is to be understood that the occupant support structure may be configured to maintain the occupant in a sitting position, or partially or fully inclined position.

While the safety seat assembly of the present invention comprises at least one preferred embodiment specifically structured to be used on marine craft, other preferred embodiments of the safety seat assembly of the present invention can be readily adapted for use on other vehicles including, but not limited to, airplanes, buses, recreational vehicles, vans, etc. Therefore, whether the seat assembly is used on a marine craft or other vehicle, included structural and operative features thereof provide sufficient versatility which enables the occupant to be protected against forcible trauma or ejection from the vehicle. In addition, the safety seat assembly of the present invention concurrently maintains the occupant and the occupant support structure in a preferred, predetermined orientation relative to the vehicle during normal and/or relatively unusual movement of the vehicle as it travels.

More specifically, it is universally recognized that water craft, as well as a variety of other types of vehicles, frequently perform relatively unusual or extreme maneuvering during the travel thereof. Such unusual movements may include sharp turns, deceleration, acceleration, etc. Also movement of the vehicle during its travel may be caused by unusual weather conditions particularly when the seat assembly of the present invention is mounted on a boat. In any of the above noted situations such unusual or extreme movement results in forces being exerted on the seat assembly or occupant support in which the occupant is disposed. Such forces, while not being sufficient to expel the occupant from the seat assembly, would frequently cause the swaying or tilting of the seat assembly and/or the occupant out of what may be referred to as a preferred and "predetermined orientation". Such predetermined orientation is considered to be a normal, substantially upright positioning of the occupant, as well as the seat or occupant support structure, when the vehicle is traveling in a normal fashion absent the extreme or unusual maneuvering thereof.

For purposes of clarity the term "upright", when defining or describing the aforementioned "predetermined orientation" of the seat assembly and occupant, is intended to describe a general attitude or orientation of the occupant and the seat assembly relative to the vehicle. Accordingly, the term "upright" is not necessarily intended to define or describe a sitting or vertically upright positioning of the occupant. To the contrary, the occupant as well as the seat assembly or occupant support structure in which the occupant is disposed may assume the "predetermined orientation" or "upright position" while being partially or fully inclined, such as when the occupant is an infant. Further, the predetermined orientation or upright positioning of the occupant and the seat assembly is to be distinguished from a laterally inclined or forward or backward tilting of the seat assembly and/or occupant which would normally occur without the use of the safety seat assembly of the present invention, such as when a water craft or vehicle is subjected to extreme maneuvering or harsh weather conditions as described in detail above.

Therefore, the safety seat of the present invention is structured to protect an occupant, particularly an infant or child, during emergency situations such as when the vehicle is involved in an accident. However the seat assembly of the present invention is also structured to restrict movement of the seat assembly and/or occupant support out of the aforementioned "predetermined orientation" during movement of the vehicle when traveling.

Accordingly, the safety seat assembly of the present invention comprises a platform secured to an appropriate location on the vehicle. A stabilization assembly is interconnected between the platform and the seat assembly and/or occupant support structure. In at least one preferred embodiment of the safety seat assembly of the present invention, specifically intended use on marine craft, the seat assembly is securely interconnected to the platform and accordingly to the vehicle. However interconnection between the stabilization assembly and the platform is such as to facilitate a quick and easy removal of the seat assembly from the platform and the vehicle, which may be necessary during emergency situations. By way of example, if it is determined that the marine craft is no longer capable of supporting the occupants thereon, the quick and easy removal of the seat assembly from the platform and into the water may be necessary. Also, under such emergency conditions the seat assembly and/or occupant support structure may also incorporate a floatation assembly as well as a ballast structure which maintains the seat assembly and the occupant in an above surface, floating position when placed in the water. As will be more fully described hereinafter, the ballast structure and the floatation device are relatively disposed and structured to properly orient the seat assembly such that the occupant therein is positioned above the surface of the water at all times.

In accomplishing its intended function, the stabilization assembly comprises at least an orientation portion preferably including a stabilizing rod and a suspension assembly. The suspension assembly, in at least one preferred embodiment, may include a biasing structure comprising a plurality of biasing segments disposed in surrounding relation to the stabilizing rod and interconnected thereto by an appropriately positioned and structured connecting link. The function and cooperative structuring of this stabilizing assembly serves to normally bias or position the stabilizing rod in a neutral orientation when unusual external forces, during movement and travel of the vehicle, are not applied to the seat assembly or occupant.

However, when the seat assembly is subjected to unusual or extreme forces, the stabilizing rod and the associated suspension assembly permit movement and or displacement of the stabilizing rod out of the neutral orientation and into any one of a plurality of orientations which may be collectively described as a universal range of movement relative to the position of a remainder of the stabilizing assembly. In order to accomplish relative movement and positioning of the stabilizing rod, it is interconnected by a moveable coupling structure to the remainder of the stabilizing assembly thereby further facilitating movement of the stabilizing rod into anyone of the afore mentioned plurality of orientations. It is further emphasized that movement of the stabilizing rod through the universal range of movement is caused by the aforementioned unusual movement or maneuvering of the vehicle as the vehicle is traveling. Accordingly the stabilizing rod, is interconnected to the platform by means of a connecting shaft or like structure and is therefore moveable with the vehicle, during travel of the vehicle, relative to a remainder of the stabilization assembly as well as the seat assembly or occupant support structure.

For purposes of clarity it may be beneficial to distinguish between the terms "travel" and "movement" when referring to the operational condition of the vehicle. Naturally, the entire safety seat assembly, including the stabilization assembly, will accompany the vehicle during its "travel". However, when the vehicle encounters unusual movement or extreme maneuvering, as described in detail herein, the stabilizing rod moves with the vehicle and relative to a remainder of the stabilization assembly and occupant support structure. The occupant support structure is thereby maintained in and/or restricted from being disposed out of the preferred, "predetermined position" as also described in detail herein.

To further protect an occupant disposed in the seat assembly, the stabilization assembly may also include a shock absorber portion to which the seat assembly is more directly connected. The shock absorber portion will be more fully described hereinafter as including a chamber in which a biasing assembly is disposed along with a shock absorbing fluid, such as oil, gas or other appropriate fluid. Therefore, the biasing assembly as well as the shock-absorbing fluid are disposed in cooperative relation to the other components of the shock absorber portion in order to dissipate any forces to which the seat assembly is subjected particularly, but not exclusively, in a vertical direction.

Other structural features of the safety seat assembly of the present invention comprise a signaling assembly which in various embodiments include structural and operative components which facilitate locating the seat assembly or occupant support and occupant, in the event of an emergency situation. More specifically, in emergency situations involving a marine craft, the seat assembly or occupant support is manually or automatically disposed overboard in a preferred floating orientation. In such situations it is of course important to locate and rescue the occupant in a rapid and efficient manner. Accordingly, the signaling assembly is structured to facilitate the visual and/or electronic location of the seat assembly.

Therefore one of the embodiments of the signaling assembly includes at least a portion of the occupant support structure or other components associated with the safety seat assembly comprising a surface treatment which may include, but not be limited to, a flourescent or other vibrant color. The portion of the seat assembly so colored should be disposed above the surface of the body of water in which the seat assembly is floating so as to be easily sighted from a marine craft or aircraft conducting a search.

In addition to or as an alternative, the occupant support structure and/or other portions of the safety seat assembly may include an electronic transmitter and/or an illuminated beacon or strobe-light structure connected thereto. Such electronic signaling components may be automatically and/or manually activated so as to begin generating light or RF signals as quickly as possible once the seat assembly is disposed overboard. Therefore, the chances of a timely rescue of the floating occupant during an emergency situation of the type set forth above will be greatly increased.

Therefore, it should be apparent that the safety seat assembly of the present invention overcomes many disadvantages and problems associated with numerous conventional and known safety devices, particularly the type intended to protect children or infants riding in a vehicle. Also, the structural versatility of the safety seat assembly of the present invention allows its use with a variety of different categories of vehicles including marine craft and other motor vehicles as set forth above.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 20 is a connecting shaft associated with the embodiment of FIG. 4.

FIG. 21 is an alternate embodiment of a connecting shaft associated with the embodiment in FIG. 4.

FIG. 22 is a front plan view of a connector used to secure either or both the embodiments of FIGS. 20 and 21 to the seat assembly of the embodiment of FIG. 2.

Like reference numerals refer to like parts throughout the several views of the drawings.

DETAILED DESCRIPTION OF THE PREFERRED EMBODIMENT

Figure 1:
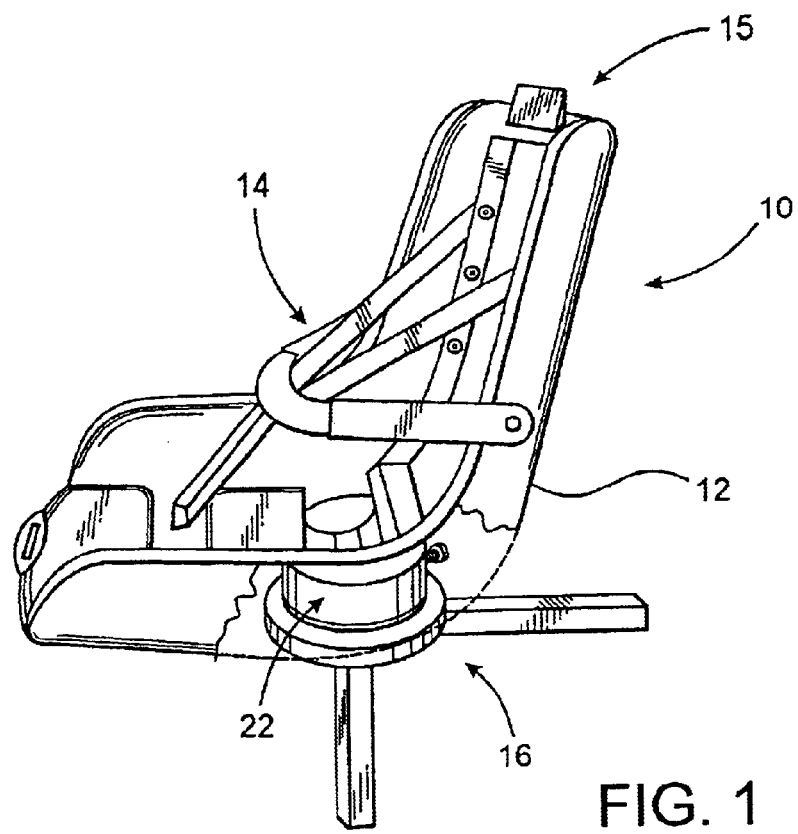
FIG. 1 is a perspective view of a safety seat assembly or occupant support structure of the present invention.
Figure 2:
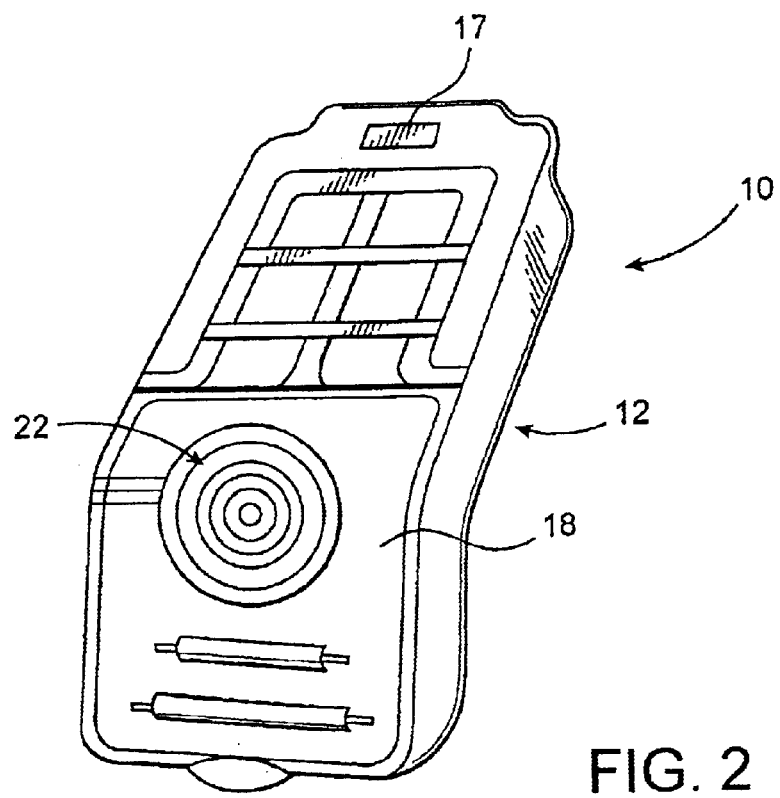
FIG. 2 is a rear perspective view of at least one preferred embodiment of the safety seat or occupant support structure of the present invention.

As shown in the accompanying drawings, the present invention is directed to a safety seat assembly generally indicated as 10 in FIGS. 1 and 2. The safety seat assembly 10 includes a seat assembly 12 which may assume a variety of different structural configurations other that a true seat type structure. More specifically, the seat assembly 12 may be in the form of a variety of different occupant support structures. Therefore dependent on its structural configuration, the seat assembly or occupant support structure 12 is specifically intended to be removably secured to an occupant so as to support the occupant in either a sitting, partially inclined or fully inclined orientation. Also, the seat assembly 12 may include some type of restraining harness or apparatus generally indicated as 14, which also may vary in size, location, configuration, etc, dependent on the overall configuration and structure of the seat assembly or occupant support 12.

The seat assembly 12 is connected to an appropriate location on the vehicle such as, but not limited to, a water craft or other vehicle by means of a platform generally indicated as 16. The platform 16 may assume a variety of different structural embodiments as depicted in FIGS. 23–26. In a preferred embodiment of the present invention, such as when the safety seat assembly 10 is mounted on a marine craft, it is preferred that the platform 16 be fixedly secured to the marine craft and that the seat assembly 12 be securely connected to but easily removed from the platform, such as in the event of an emergency situation.

As demonstrated in FIG. 2, the seat assembly or like occupant support structure 12 also includes a floatation device 18 disposed on or within a supporting frame portion of the seat assembly 12. This floatation device 18 is included within the seat assembly 12 when it is intended to be mounted or used in combination with various types of marine craft. However, when the seat assembly 12 is designed to be used with other vehicles such as airplanes, land vehicles, etc, the floatation device 18 may or may not be included. In addition, when the seat assembly 12 is used on a marine craft, other structural features thereof include the provisions of a ballast structure generally indicated as 20 in FIG. 4. The floatation device 18 has a sufficient degree of buoyancy and is cooperatively disposed and structured with the ballast structure 20 to self-right or automatically dispose the occupant support structure 12 in an above the surface, floating position thereby assuring that an occupant will not remain submerged.

Other structural features particularly, but not exclusively, adaptable for use on the occupant support structure or seat assembly 12 associated with a marine craft include a signaling assembly. The signaling assembly includes one or more signaling structures or devices which may be used in combination or independently of one another. More specifically and with reference to FIGS. 1 and 2, at least one embodiment of the safety seat assembly 10 includes an illuminated beacon 15 mounted in any one of a plurality of appropriate locations on the occupant support structure 12 which best facilitates its visual observation. As such, in an emergency event, such as when the occupant support 12 is placed in the water and oriented so as to maintain the occupant in an above surface position, the beacon 15 is structured to be automatically or manually activated. When so activated, the beacon 15 produces highly visible light, such as by means of a strobe-light mechanism, which facilitates visual observation and location of the seat assembly 12 from a significant distance.

In addition to the beacon device 15 or as an alternative thereto, the signaling assembly may include an electronic transmitter 17 mounted on or connected to the occupant support 12 in any one of a plurality of appropriate positions. Further, because of the marine environment, the transmitter 17 should be protected against exposure to the water, even if partially or completely submerged. As with the beacon 15, the transmitter 17 may be structured to be automatically and/or manually activated and tuned to transmit appropriate signals on an emergency or other predetermined band or wavelength. As a result, electronic tracking and determination of the location of the occupant support structure 12, when floating in a body of water, can be accurately and quickly achieved.

Yet another embodiment of the signaling assembly comprises a more simplistic approach and includes the seat assembly or occupant support structure 12 having a readily observable exterior surface treatment or finish. Moreover, the exterior surface of all or at least a portion of the occupant support 12 may be structured to demonstrate a flourescent or other vibrant, easily observable color. Other surface treatments may include a reflective and/or highly polished surface which is responsive to light from the sun or other light sources. As such, marine craft, other vehicles in the general vicinity of the floating seat assembly 12 would have less trouble visually locating it thereby further facilitating a quick rescue of the occupant.

Figure 3:
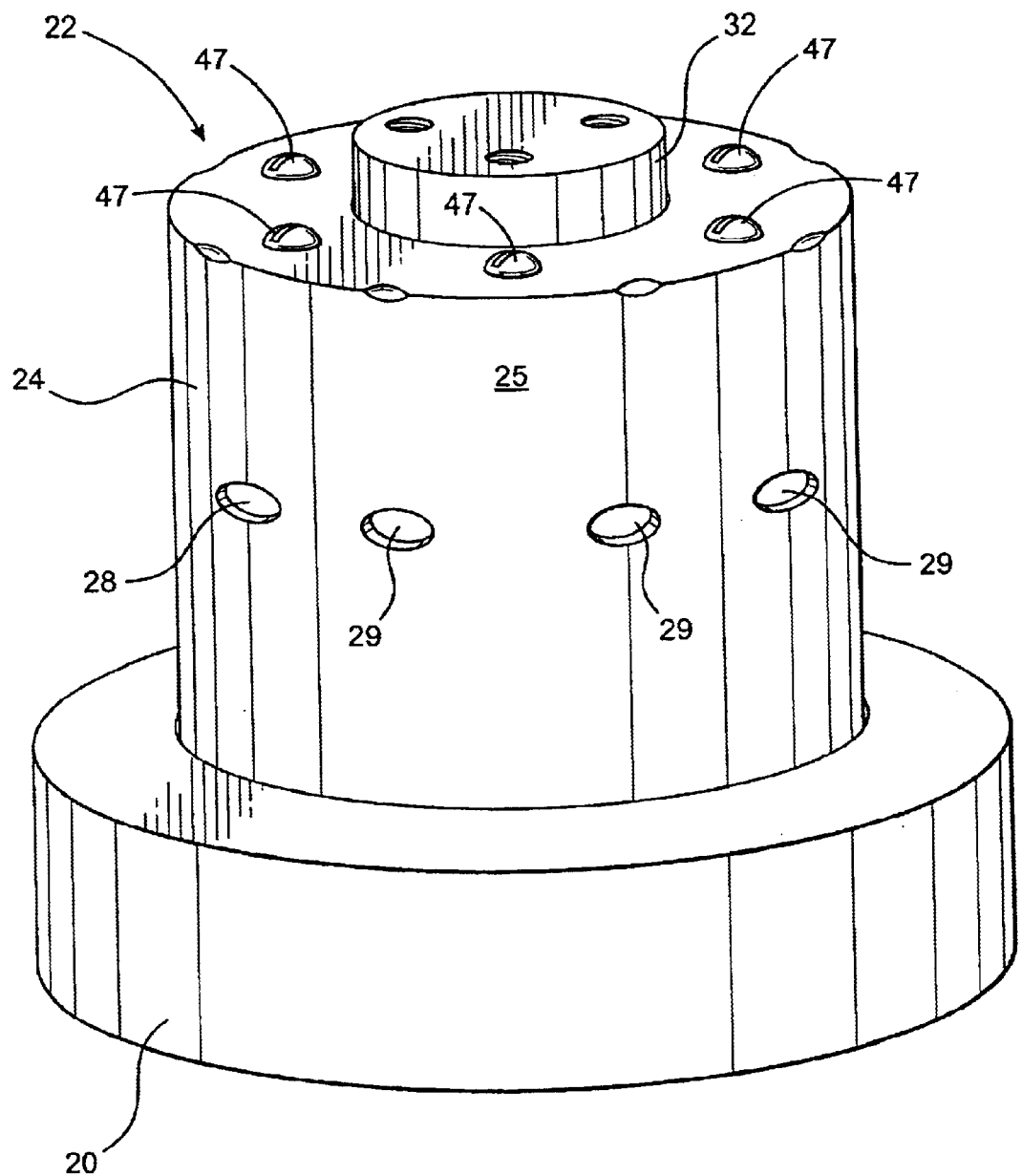
FIG. 3 is a perspective view of a stabilization assembly associated with the embodiments of FIGS. 1 and 2.
Figure 4:
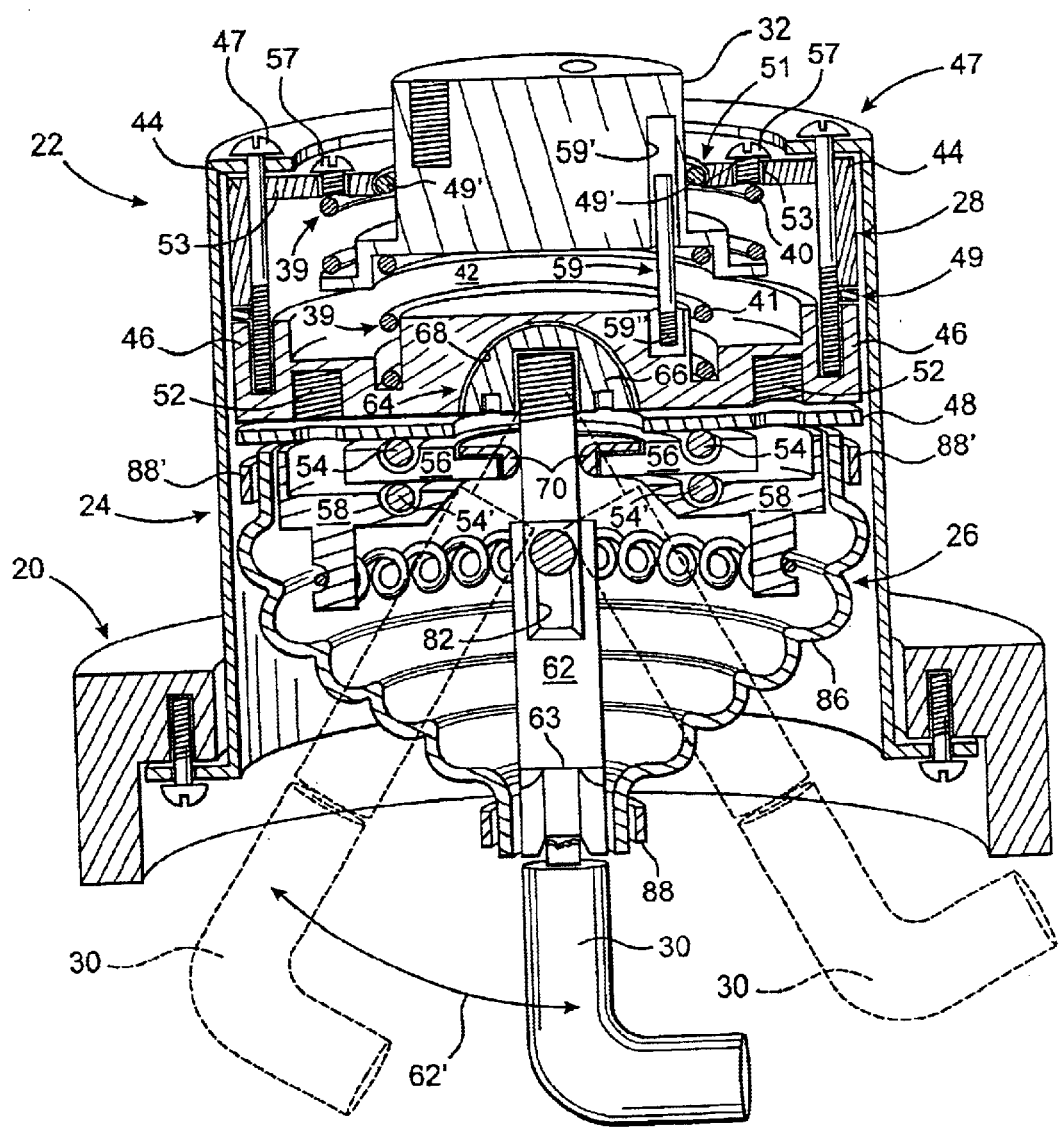
FIG. 4 is an interior perspective view in cross-section showing structural components associated with the stabilization assembly of the embodiment of FIG. 3.

As generally demonstrated in FIGS. 1 and 2 and more specifically represented in FIGS. 3 and 4, another structural feature of the safety seat assembly 10 comprises the provision of a stabilizing assembly generally indicated as 22. The stabilizing assembly 22 includes a housing 24 having a surrounding or enclosing sidewall 25 which may include a plurality of vent openings or apertures 29. The vent apertures 29 are provided to allow the escape of air from certain interior portions of the housing 24 when the seat assembly 12 is placed in the water in the event of an emergency situation of a water craft. The venting of air from the interior of the housing 24 is accomplished to further facilitate the proper positioning of the seat assembly 12 and the occupant therein in an above surface, floating position.

With specific reference to FIG. 4, the operative components of the stabilization assembly 22 are shown in working, cooperative relation to one another. More specifically, the stabilization assembly 22 comprises an orientation portion generally indicated as 26 and preferably a shock absorber portion generally indicated as 28. The orientation portion 26 interconnects a remainder of the stabilization assembly 22 to the platform 16 and accordingly to the vehicle to which the platform 16 is fixedly secured. Interconnection between the orientation portion 26 and the platform 16 preferably occurs by means of a connecting shaft 30 or 30', shown in detail in FIGS. 20 and 21.

Figure 5:
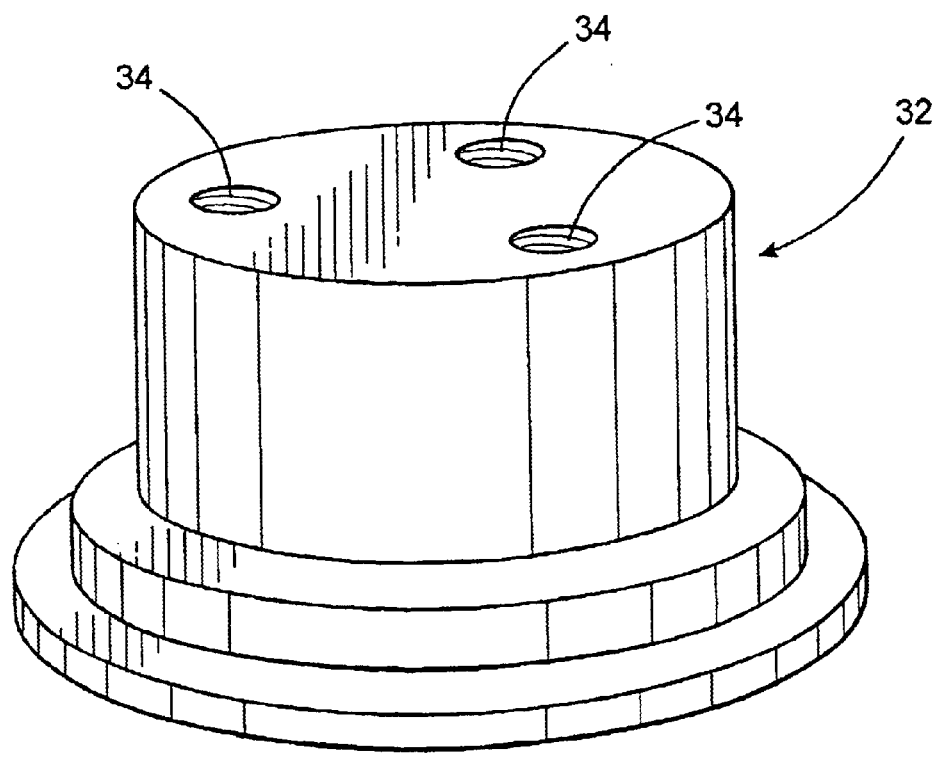
FIG. 5 is a perspective view of an operative component of the stabilization assembly of the embodiment of FIG. 4.
Figure 6:
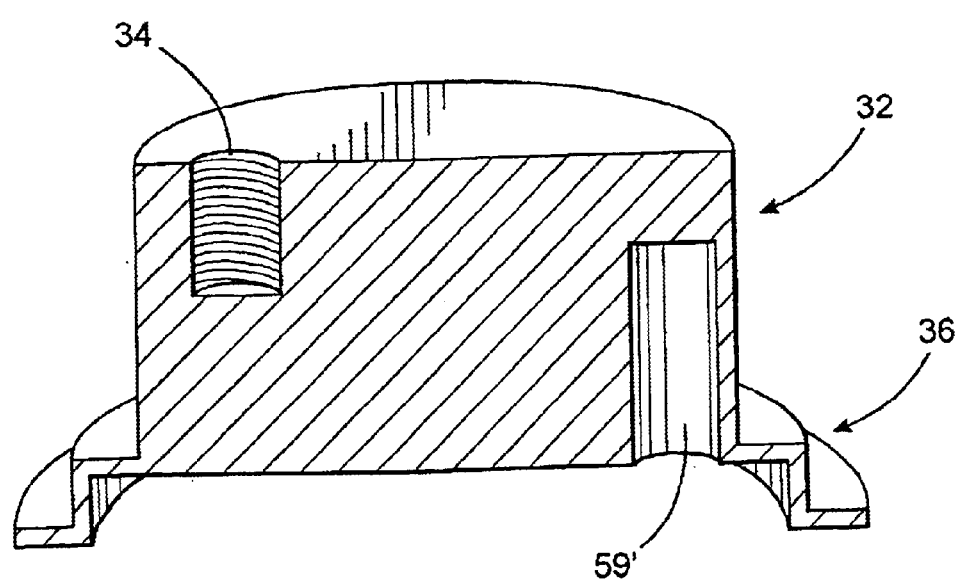
FIG. 6 is a perspective sectional view of the embodiment of FIG. 5.

The shock absorber portion 28 is interconnected to the occupant support or seat assembly 12 by a piston structure 32 also shown in detail in FIGS. 5 and 6. The piston 32 includes one or more receiving, internally threaded sockets 34 disposed and structured to receive appropriate connectors which serve to attach a frame portion of the seat assembly 12 directly to the piston 32. The piston 32 includes a stepped end portion generally indicated as 36 to facilitate connection to a biasing assembly generally indicated in FIG. 4 as 39. The biasing assembly 39 includes at least a first and second biasing element or spring 40 and 41 respectively, cooperatively disposed and independently engaging the stepped end portion 36 of the piston 32 so as to normally dispose it in a suspended position as demonstrated in FIG. 4. However the piston 32, by virtue of its interconnection to the biasing assembly 39, is allowed to move reciprocally into and out of an interior chamber 42 of the shock absorber portion 28, so as to absorb forces exerted on the occupant support structure 12.

Figure 7:
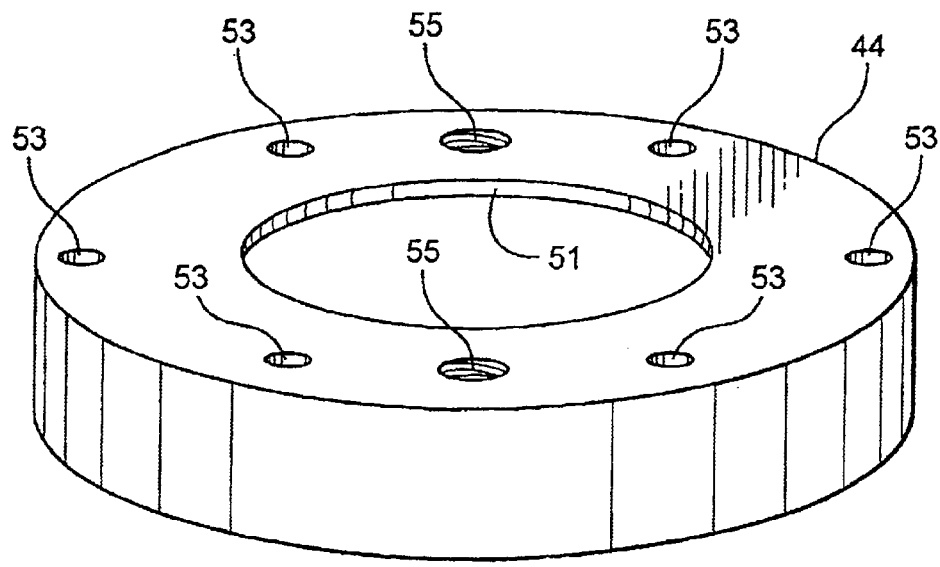
FIG. 7 is a perspective view of a structural component of the embodiment of FIG. 4.
Figure 8:
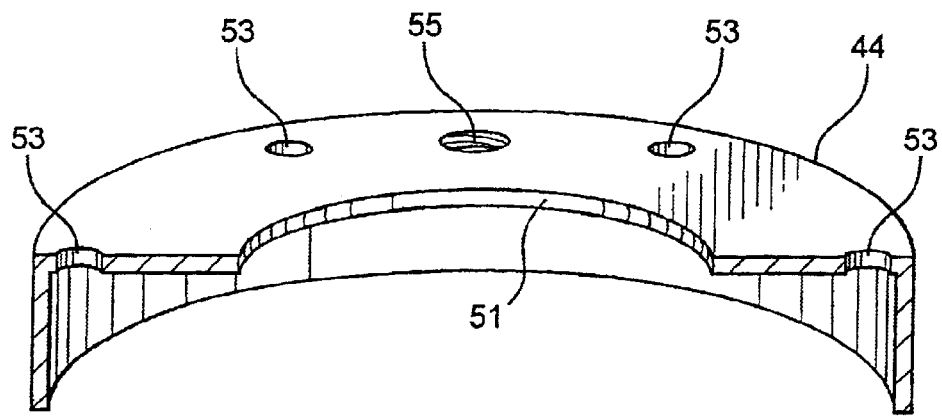
FIG. 8 is a perspective view in section of the embodiment of FIG. 7.
Figure 9:
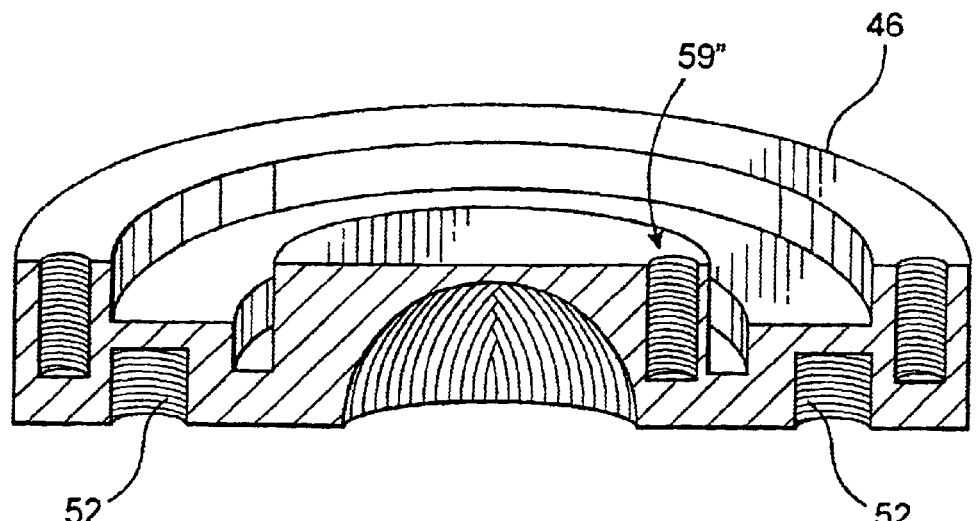
FIG. 9 is a perspective view in section of another component associated with the embodiment of FIG. 4.
Figure 10:
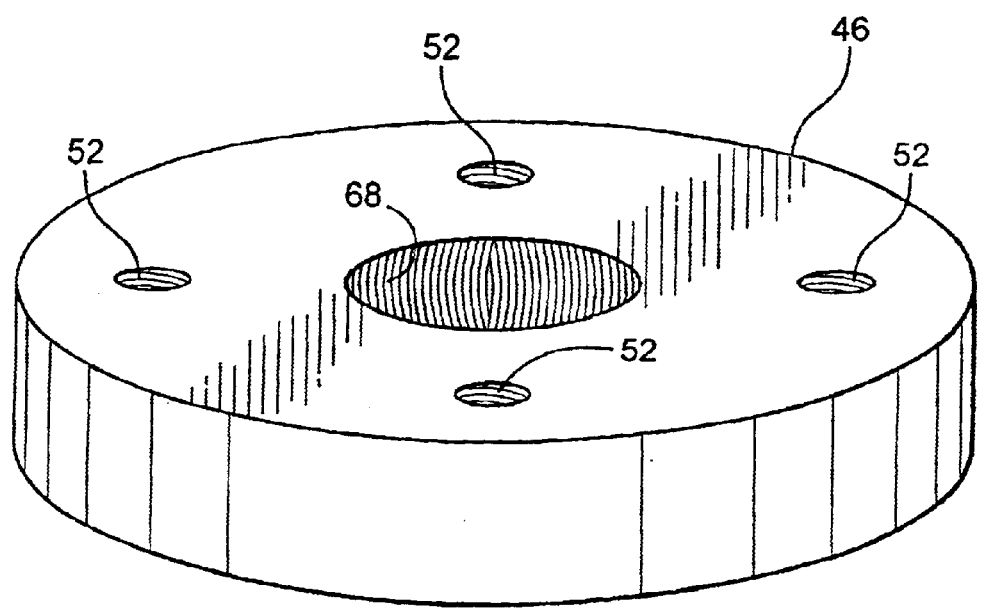
FIG. 10 is an exterior perspective view of the embodiment of FIG. 9.

Moreover, one preferred embodiment of the shock absorber portion 28 comprises an upper end cap 44, shown in detail in FIGS. 7 and 8 and a base cap 46, shown in detail in FIGS. 9 and 10. Collectively, the upper cap 44 and the base cap 46 are secured together to form the interior chamber 42 which is substantially fluid tight so as to restrict the escape of a shock-absorbing fluid such as, but not limited to oil or other fluid therefrom. Interconnection of the cap 44 and base cap 46 is preferably accomplished by a plurality of elongated bolts or like connectors 47 passing through appropriate apertures within an upper part of the housing 24 as also pictured in FIG. 3. The fluid tight sealing of interior chamber 42 is facilitated by an annular, ring-type gasket or seal member 49 and the o-type seal ring 49' respectively disposed between the junction of the upper end cap 44 and base cap 46 and in sealing engagement with the exterior surface of the piston 32 about the periphery of an access opening 51.

As such, the piston 32, once being connected to the frame of the seat assembly or occupant support structure 12 is allowed to move reciprocally along its own longitudinal axis into and out of the interior chamber 42. As set forth above shock absorbing features include the provision of the biasing assembly 39 and the presence of the shock absorbing fluid maintained within the chamber 42. Such shock absorbing fluid may be added or removed from the chamber 42 by means of fill apertures 55 extending through an upper portion of the cap 44 as also demonstrated in FIG. 7. The remaining apertures 53 are disposed to receive the connecting bolts 47 there through, as set forth above. Appropriate closure plugs or like structures 57 are provided to close the fill apertures 55 when the shock absorber portion 28 is assembled and operative.

In at least one preferred embodiment of the present invention the piston 32, being connected to the seat assembly 12 is allowed the aforementioned shock absorbing reciprocal movement. However, in order to maintain a preferred, "predetermined orientation" of the occupant support structure 12 as well as the occupant, relative to the vehicle it is preferred that the piston 32 not be allowed to longitudinally rotate. Accordingly a dowel 59 may slidingly be received within an elongated channel 59' of the piston 32, wherein the opposite end of the dowel 59 is fixedly secured to the base cap 46 as at 59".

Figure 11:
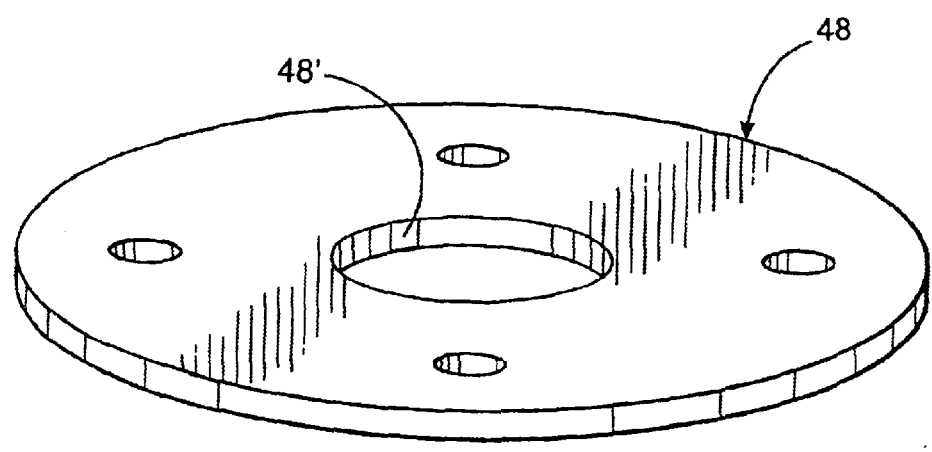
FIG. 11 is a perspective view of yet another structural component of the embodiment of FIG. 4.

In a most preferred embodiment the stabilization assembly 22 includes the orientation portion 26 in combination with the shock absorber portion 28 described above. As also described the orientation portion 26 is moveable with the vehicle, relative to a remainder of the stabilization assembly 22 generally and the shock absorber portion 28 and occupant support structure 12 specifically. Movement between the orientation portion 26 and the remainder of the stabilization assembly 22, is facilitated by a disposition of a rigid material liner or insert disposed between the shock absorber portion 28 and the orientation portion 26. The insert 48 is demonstrated in an assembled Position in FIG. 4 and in detail in FIG. 11. The insert 48 is fixedly secured to a bottom or exterior surface of the base cap 46 by means of a plurality of connectors disposed within different ones of the receiving channels 52.

Figure 12:
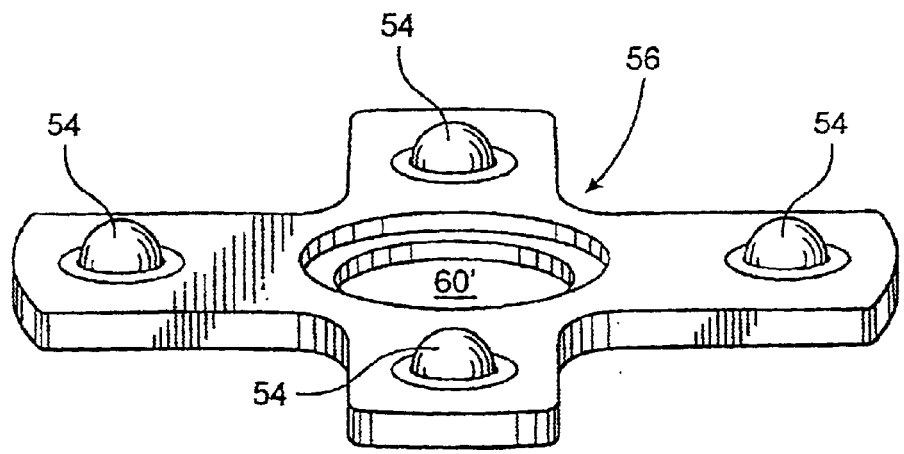
FIG. 12 is a perspective view of a clutch member associated with the embodiment of FIG. 4.
Figure 13:
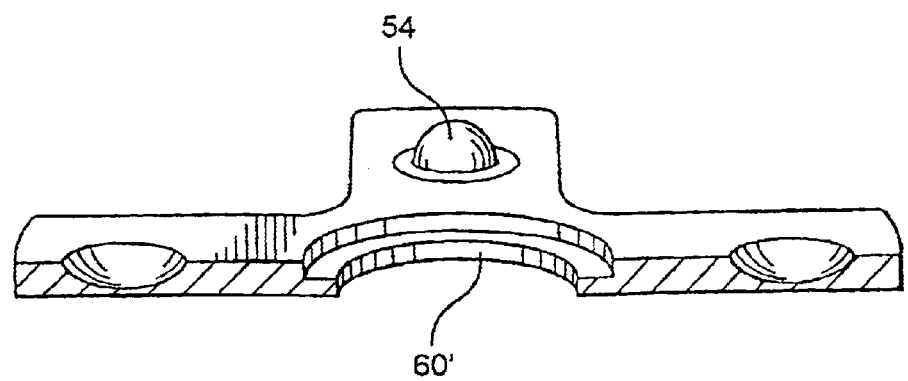
FIG. 13 is a perspective view in section of the embodiment of FIG. 12.
Figure 14:
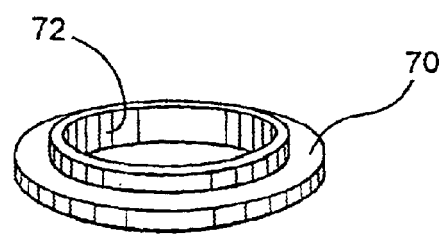
FIG. 14 is a bushing structure associated with the clutch assembly of the embodiment of FIGS. 12 and 13.
Figure 15:
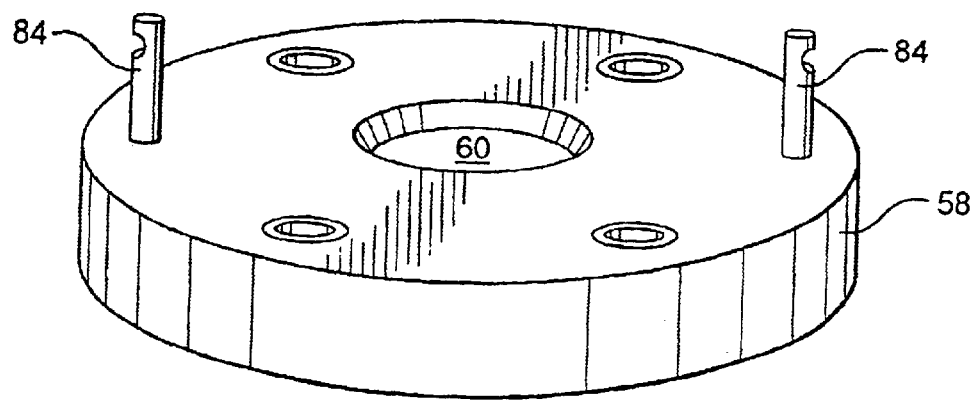
FIG. 15 is a perspective view of another structural component associated with the embodiment of FIG. 4.
Figure 16:
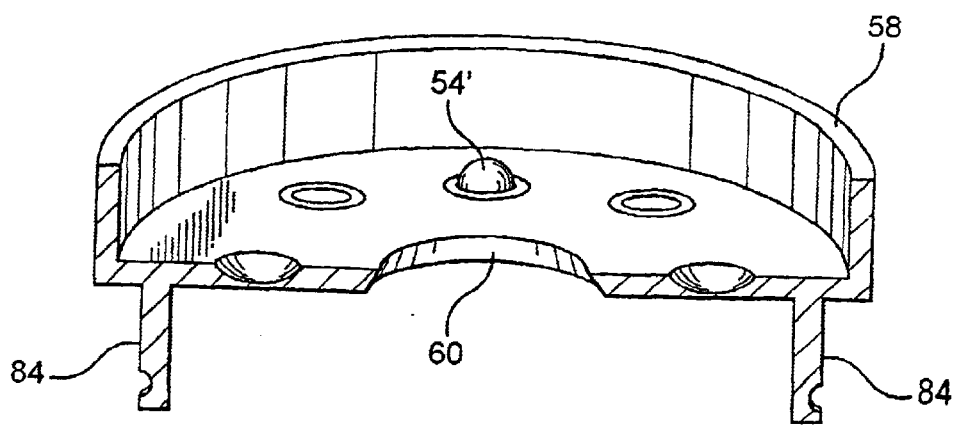
FIG. 16 is interior perspective view of the embodiment of FIG. 15.

Further, the insert 48 is formed of a material having sufficient strength and durability to serve as a "race" on which a plurality of bearing members 54 may travel. The bearing members 54 can be considered part of a clutch assembly including clutch plate 56 (see FIGS. 12–14) moveable laterally or transversely relative to the longitudinal axis of the housing 24. In addition to the clutch plate 56 housing the bearing members 54, the clutch assembly further includes a clutch cover plate 58 also including bearing members 54' which engage the outer or exterior surface of the clutch plate 56 as clearly shown in FIG. 4. The clutch cover plate 58, shown in detail in FIGS. 15 and 16 includes a centrally disposed opening or aperture 60 disposed in a generally aligned relation with a central aperture 60' formed in the clutch plate 56. The aligned apertures 60 and 60' are disposed and configured to receive passage there through of a stabilizing rod 62. The stabilizing rod 62 comprises at least one of the primary supporting connections between the orientation portion 26 and the platform 16 by virtue of its attachment with the connecting shaft 30 or 30' as briefly described above.

With primary reference to FIGS. 4 and 17–19, the stabilizing rod 62 has connected thereto or formed thereon at least a portion of a coupling structured generally indicated as 64. The coupling structure 64 comprises a moveable coupling preferably including a ball member 66 and a socket portion 68. The socket portion 68 is formed in the undersurface of the base cap 46 associated with the shock absorber portion 28, as described above. It is of course to be understood that the recess or socket type configuration of the socket 68 substantially corresponds to the exterior, hemispherical surface of the ball member 66. The coupling structure 64 in cooperation with the clutch assembly, including the clutch plate 56 and the clutch cover plate 58, facilitates movement of the stabilizing rod 62 into any one or more of a plurality of different orientations. More specifically, the stabilizing rod 62 is allowed to freely move throughout a substantially "universal range" of movement relative to the remainder of the stabilization assembly 22 generally and the shock absorber portion 28 and the seat assembly 12 specifically.

Such universal range of movement of the stabilizing rod 62 is further facilitated by the sliding, transversely directed travel of the clutch plate 56 relative to the clutch cover plate 58 as well as a remainder of the stabilization assembly 22. Further facilitating such universal range of movement is the provision of an annularly configured bushing 70 disposed within the central aperture 60' of the clutch plate 56. The bushing 70 may be formed of a Teflon™ or other material which, does not prevent significant frictional resistance to the movement of the stabilizing rod 62 as it engages the interior peripheral surface 72 of the bushing 70.

Other structural features associated with the orientation portion 26 include the provision of a suspension assembly structured to allow the normal orientation of the stabilizing rod 62 in what may be referred to as a "neutral position" as depicted in solid lines in FIG. 4. The neutral position of the stabilizing rod 62 is accomplished when there is no unusual movement of the vehicle or other forces being applied to the seat assembly 12, such as during extreme weather conditions of a marine craft or during unusual maneuvering of the marine craft or other vehicle as described in detail above.

Figures 17, 18:
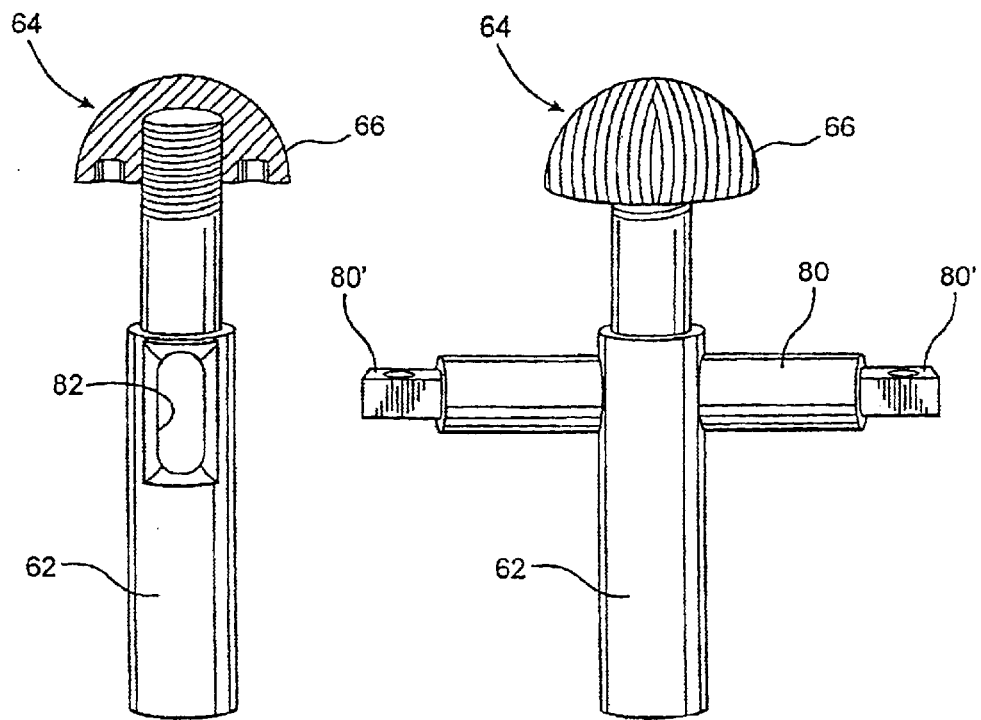
FIG. 17 is a front plan view of a stabilizing rod associated with the embodiment of FIG. 4.
FIG. 18 is a perspective view in partial cutaway of the stabilizing rod including a connecting link attached thereto.
Figure 19:
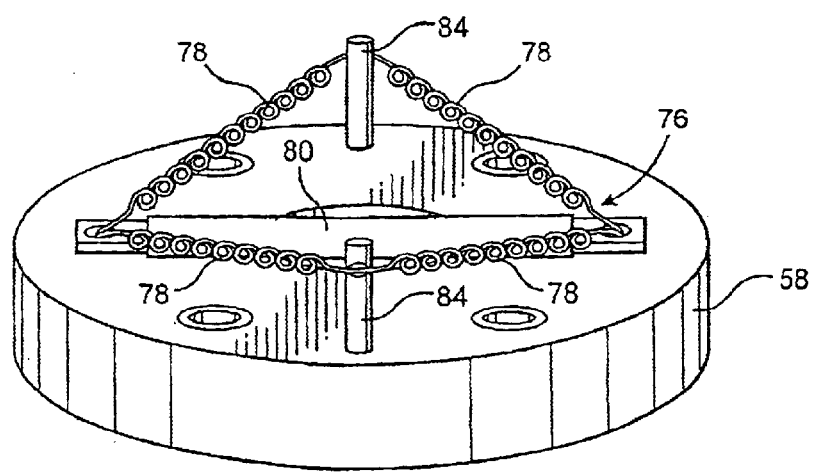
FIG. 19 is an top perspective view in partially assembled form of the embodiment of FIG. 18.
Figure 23:
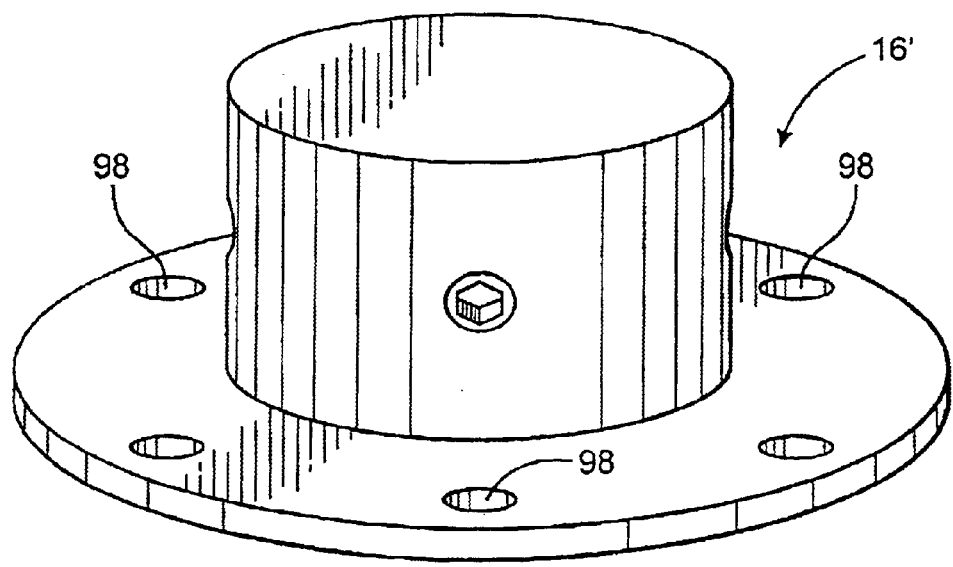
FIG. 23 is a perspective view of one preferred embodiment of a portion of a platform to which the embodiment of FIGS. 1 or 2 is connected.
Figure 24:
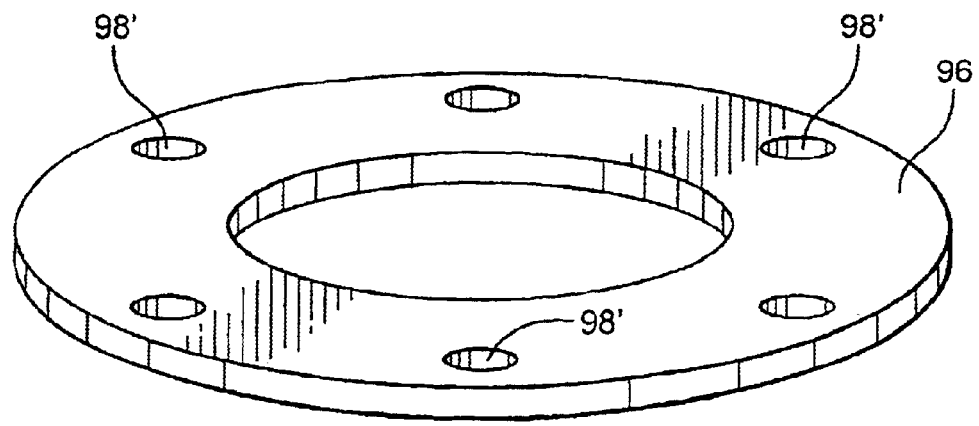
FIG. 24 is a perspective view of a mounting plate associated with the platform of the embodiment of FIG. 23.
Figure 25:
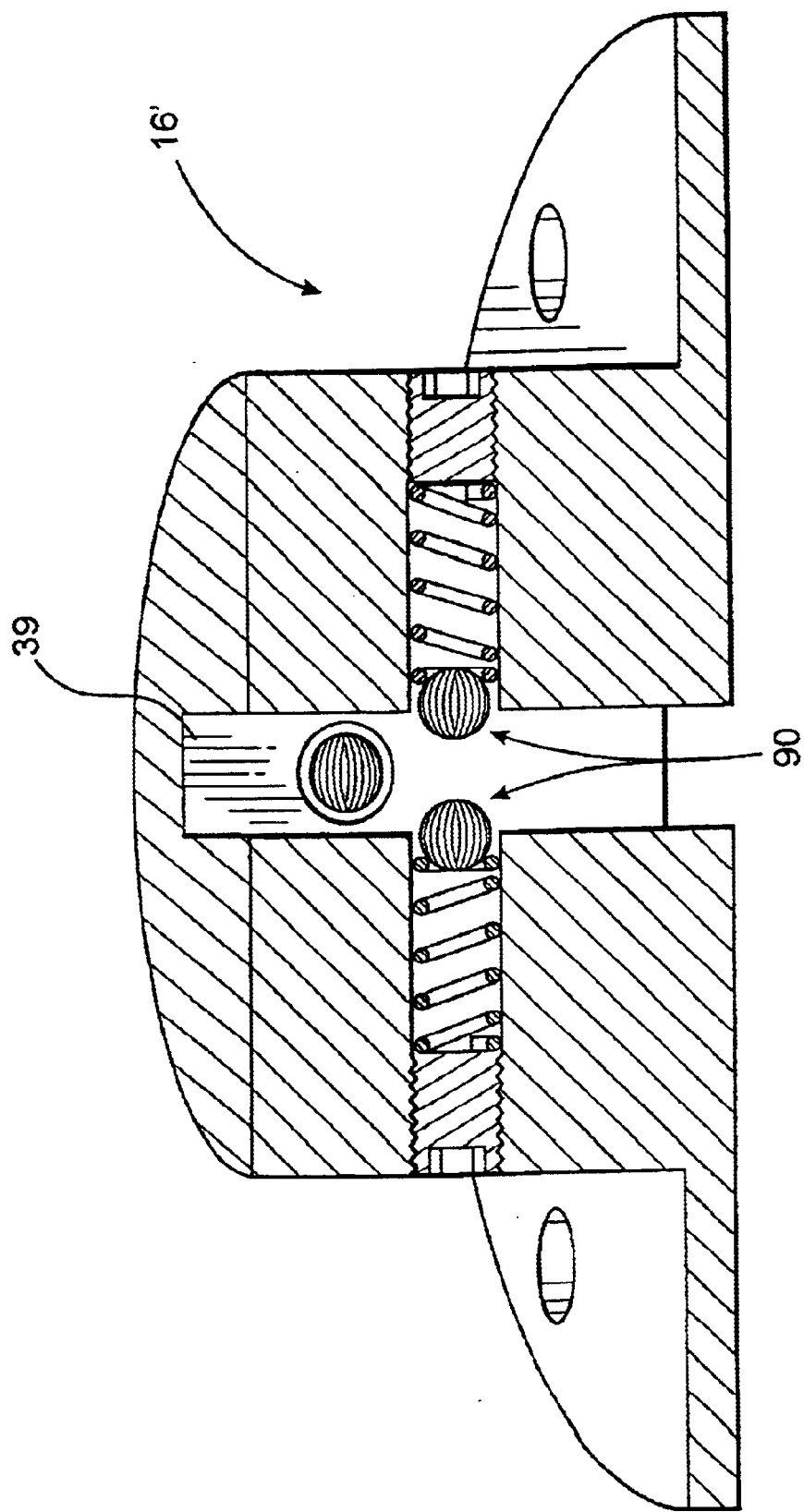
FIG. 25 is an interior perspective view in section of the embodiment of FIG. 23.
Figure 26:
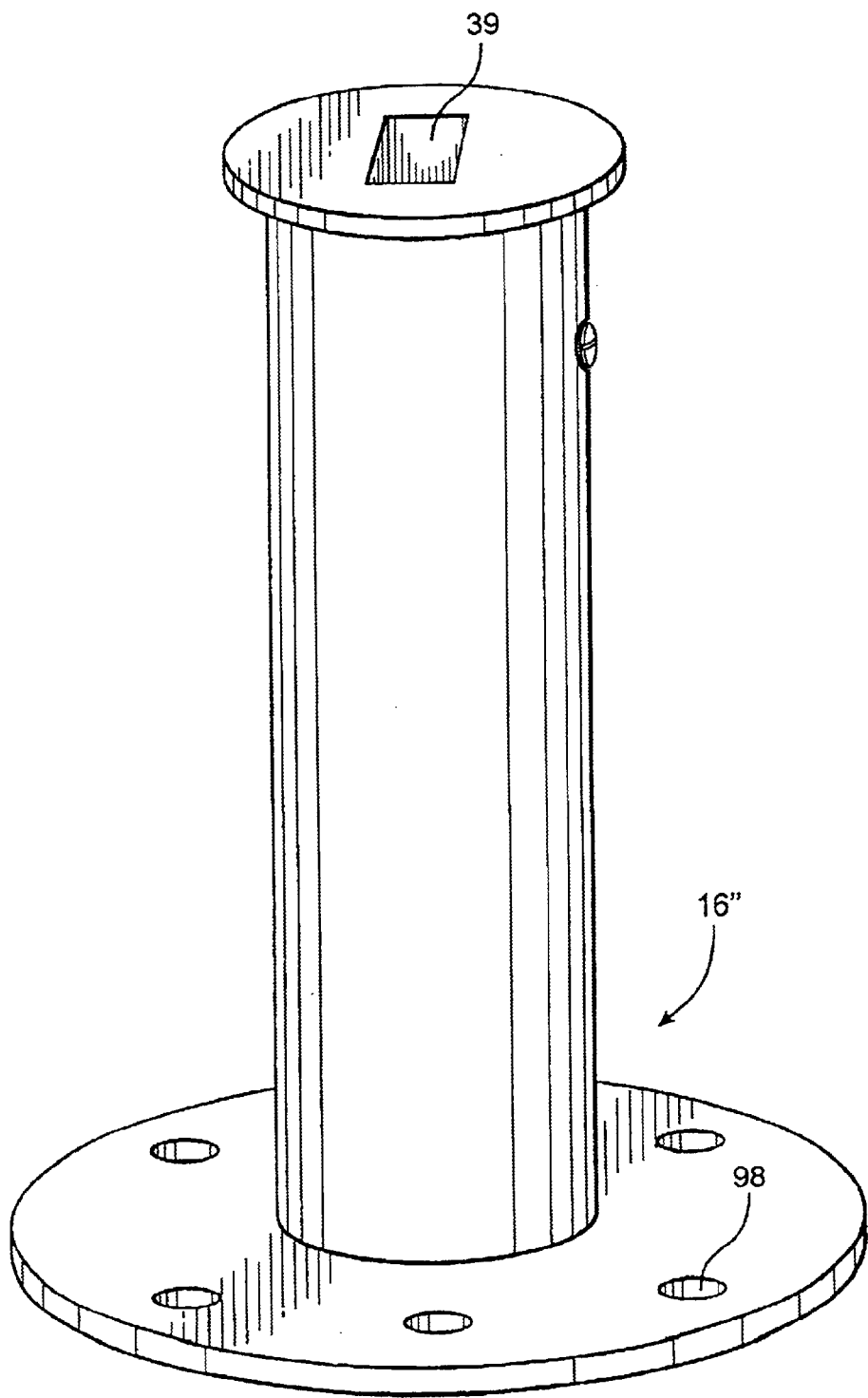
FIG. 26 is a perspective view of yet another embodiment in the form of supporting pedestal of a platform for mounting the embodiment of FIGS. 1 or 2 on a vehicle.

Moreover, the biasing structure is generally indicated as 76 and comprises a biasing spring or like structure and/or a plurality of biasing segments 78. As disclosed in FIG. 19 the biasing structure 76 movably interconnects the stabilizing rod 62 to a remainder of the orientation portion 26. The suspension assembly further includes a connecting link 80 which, as shown in FIG. 18, passes transversely through the stabilizing rod 62. To accomplish interconnection between the connecting link 80 and the stabilizing rod 62, an elongated, multi-sided channel 82 is formed in a portion of the stabilizing rod 62. The connecting link 80 is correspondingly configured to pass through the channel 82 and extend outwardly from both sides thereof. Further the opposite ends or extremities 80' of the connecting link 80 are disposed and structured, when in a proper orientation, to engage corresponding portions of the one or more biasing spring segments 78.

Oppositely disposed spaced apart end portions of the one or more biasing springs 78 are secured to mounting posts 84 formed on and extending outwardly from the undersurface of the clutch cover plate 58 as clearly shown in both FIGS. 4, 15–16 and 19. Accordingly, the biasing structure 76 assumes a substantially multi-sided configuration disposed in surrounding relation to the stabilizing rod 62. Further, the biasing structure 76 is disposed and structured in cooperation with the connecting link 80, transversely secured to the stabilizing rod 62, to maintain the stabilizing rod 62 normally in the neutral position of FIG. 4.

However upon movement of the vehicle, to which the platform 16 is attached, in a manner which would provide displacing forces being exerted on the occupant and the seat assembly 12, the stabilizing rod 62 will move, relative to the seat assembly, into any of the one or more of the plurality of orientations throughout the aforementioned universal range off movement as indicated schematically in phantom lines in FIG. 4. Therefore, while the stabilizing rod 62 and attached connecting shaft 30 or 30' are structured and secured to move with the vehicle relative to the remainder of the stabilization assembly 22 and occupant support structure 12, the occupant and occupant support structure 12 will be maintained in the aforementioned and preferred "predetermined orientation" or "upright position", regardless of the orientation of the vehicle. Naturally, the universal range of movement of the stabilizing rod 62 is limited within certain parameters. In at least one preferred embodiment, the stabilizing rod 62 may move outwardly into any of the aforementioned universal range of movement through and up to an angular position of approximately 30 degrees from the neutral position of stabilizing rod 62 as schematically represented by the directional arrow 62'.

Yet additional features associated with the orientation portion 26 is the provision of a moveable or flexible material cover such as bellows 86. The bellows 86 is secured about an outer surface of the stabilizing rod 62 by an appropriate connector or clamp 88 and about an exterior portion of the clutch cover plate 58 as at 88'. The provision of the flexible material cover or bellows 86 allows for at least partial filling of a lubricating fluid within the interior of the bellows 86 so as to further facilitate movement of the stabilizing rod throughout the afore mentioned universal range of movement as set forth above.

As described above, the stabilization assembly 22 is interconnected to any one of a plurality of different platforms 16, 16' and/or 16" disclosed in FIGS. 23–26. Accordingly, one of the connecting shafts 30 or 30' includes one end as at 33 and or 33' attachable directly to a corresponding end 63 of the stabilizing rod 62. The opposite end as at 35 and 35', is designed to be received within a receiving channel 39 and/or 39' of one of the platforms 16' and/or 16". By virtue of the elongated multi-sided ends 35 or 35' being disposed in the interior of the receiving channels 39 of a respective platform 16' and 16", a firm, secure attachment is thereby accomplished. However a spring bias connecting assembly 90 cooperates with one or more recessed portions 92 to facilitate quick and easy removal of the respective connecting shafts 30 and 30' from the platform 16' or 16". Such quick removal may be required in case of extreme emergency situations such as when the seat assembly 12, as well as the stabilization assembly 22, need be taken off the marine craft or removed from the other vehicle with which the safety seat assembly 10 of the present invention is utilized. As demonstrated in FIGS. 23–25, the platform 16' is disposed to be secured to a mounting plate as at 96 such that portion of the vehicle, such as a fiberglass deck or like segment thereof, is sandwiched there between. Appropriate apertures are provided as at 98 and 98' to receive through bolts or other appropriate connectors.

As will be noted from a review of FIG. 21, connecting shaft 30 assumes a right angled configuration which facilitates mounting of the stabilization assembly 22 to the vehicle or appropriate platform 16 in an off-center or radially outward extending orientation. To the contrary, FIG. 20 shows an elongated linearly configured connecting shaft 30' wherein the stabilization assembly 22 and a platform 16 and/or 16', 16" are mounted in substantially coaxial relation to one another. The connecting shafts 30 and 30' may be initially disposed and/or stored within the frame or other appropriate portion of the seat assembly 12 as indicated in FIG. 2 and be removably attached in such a stored position by virtue of a pin-like connector 99 generally indicated in FIG. 2.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly for safely supporting an occupant within a vehicle, said assembly comprising:
   a) an occupant support structure removably secured to the occupant and structured to position the occupant in a predetermined orientation relative to the vehicle,
   b) a platform secured to the vehicle in supporting relation to said occupant support structure,
   c) a stabilization assembly moveably interconnecting said occupant support structure to said platform and the vehicle,
   d) said stabilization assembly including an orientation portion moveable relative to said occupant support structure in response to movement of the vehicle during travel,
   e) said orientation portion cooperatively structured with a remaining portion of said stabilization assembly to restrict movement of the occupant and said occupant support structure out of said predetermined orientation during travel of the vehicle, and
   f) a movable coupling disposed in innerconnecting relation between said orientation portion and said remaining portion, said movable coupling structured to facilitate disposition of said orientation portion throughout a substantially limited, universal range of movement relative to said remaining portion and said occupant support structure.

2. An assembly as recited in claim 1 wherein said stabilization assembly is removably connected to said platform.

3. An assembly as recited in claim 2 wherein said platform is fixedly secured to the vehicle.

4. Assembly as recited in claim 1 wherein said remaining portion of said stabilization assembly is interconnected to said occupant support structure.

5. An assembly as recited in claim 4 wherein said orientation portion is moveably connected to said remaining portion and moveable with the vehicle relative to the occupant support structure into a plurality of different orientations during travel of the vehicle.

6. An assembly as recited in claim 1 wherein said moveable coupling comprises a ball and socket connection.

7. An assembly as recited in claim 1 wherein said occupant support structure is connected to said remaining portion in a substantially upright position, said upright position at least partially defining said predetermined orientation of said occupant support structure and the occupant relative to the vehicle.

8. An assembly as recited in claim 7 wherein said occupant support structure is moveably connected to said remaining portion and reciprocally mounted relative thereto while in said predetermined orientation.

9. An assembly as recited in claim 1 wherein said remaining portion comprises a shock absorber portion connected to said occupant support structure.

10. An assembly as recited in claim 9 wherein said shock absorber portion comprises a chamber and a piston disposed within said chamber, said piston connected to said occupant support structure.

11. An assembly as recited in claim 10 wherein said occupant support structure is secured to move with said piston, said piston moveable within said chamber into and out of a substantially suspended position within said chamber.

12. An assembly as recited in claim 11 wherein said shock absorber portion further comprises a biasing assembly connected to said piston and disposed and structured to normally maintain said piston in said suspended position.

13. An assembly as recited in claim 12 wherein said piston is reciprocally mounted within said chamber.

14. An assembly as recited in claim 10 further comprising a shock absorbing fluid disposed within said chamber.

15. An assembly as recited in claim 1 further comprising a flotation device structured to include a sufficient degree of buoyancy to maintain said occupant support structure and the occupant therein an above surface, floating position in a body of water.

16. An assembly as recited in claim 1 wherein said stabilization assembly comprises a housing; said orientation portion and a shock absorber portion mounted within said housing.

17. An assembly as recited in claim 16 wherein said orientation portion further comprises a moveable coupling disposed in interconnecting relation between said orientation portion and said shock absorber portion, said moveable coupling configured to facilitate disposition of said orientation portion throughout said substantially limited, universal range of movement relative to said shock absorber portion and said occupant support structure.

18. An assembly as recited in claim 17 wherein said moveable coupling comprises a ball and socket connection.

19. An assembly as recited in claim 17 wherein said occupant support structure is connected to said shock absorber portion in a substantially upright position, said upright position at least partially defining said predetermine orientation of said occupant support structure and the occupant relative to the vehicle.

20. An assembly as recited in claim 17 wherein said orientation portion further comprises a stabilizing rod moveable relative to said shock absorber portion; a suspension assembly disposed and structured to normally maintain said stabilizing rod in a neutral orientation.

21. An assembly as recited in claim 20 wherein said suspension assembly comprises a biasing structure interconnected to said stabilizing rod and disposed in a predetermined array relative thereto.

22. An assembly as recited in claim 21 further comprising a connecting link interconnecting said stabilizing rod to said biasing structure, said biasing structure disposed in surrounding relation to said stabilizing rod.

23. An assembly as recited in claim 22 wherein said biasing structure comprises a plurality of biasing segments disposed in a substantially multi-sided array.

24. An assembly as recited in claim 22 wherein said connecting link is normally disposed in substantially aligned relation to a length of the vehicle and in transverse relation o the stabilizing rod.

25. An assembly as recited in claim 20 further comprising a connecting shaft secured to said stabilizing rod and interconnecting said stabilization assembly to said platform.

26. An assembly as recited in claim 25 wherein said connecting shaft is moveable with said stabilizing rod relative to said occupant support structure and is removably attached to said platform.

27. An assembly as recited in claim 26 wherein said platform is fixedly secured to the vehicle; said stabilization assembly and said connecting shaft being collectively removable from said platform.

28. An assembly as recited in claim 1 wherein said substantially limited, universal range of movement comprises an outwardly, angularly disposed limit of generally about 30 degrees from a predetermined neutral position.

29. An assembly for safely supporting an occupant on a marine craft, said assembly comprising;
   a) a seat assembly removably secured to the occupant and structured to position the occupant in a predetermined orientation relative to the marine craft,
   b) a platform mounted on the marine craft and interconnected in supporting relation to said seat assembly,
   c) a stabilization assembly moveably interconnecting said seat assembly to said platform and the marine craft,
   d) said stabilization assembly including an orientation portion and a coupling structure moveably interconnecting said orientation portion to a remainder of said stabilization assembly,
   e) said orientation portion moveable relative to said seat assembly in response to movement of the marine craft; during travel of the marine craft;
   f) said coupling structure and said orientation portion cooperatively structured to restrict movement of said seat assembly and the occupant out of said predetermined orientation during travel of the marine craft; and
   g) said coupling structure configured to facilitate movement of said orientation portion throughout a substantially limited, universal range of movement relative to a remainder of said stabilization assembly and said seat assembly.

30. An assembly as recited in claim 29 wherein said seat assembly is removably interconnected to said platform.

31. An assembly as recited in claim 30 further comprising a floatation device connected to said seat assembly, said floatation device including a sufficient degree of buoyancy to maintain said seat assembly and the occupant in an above surface, floating orientation.

32. An assembly as recited in claim 31 further comprising a ballast structure interconnected to said seat assembly and cooperatively disposed relative to said floatation device to orient the occupant in a floating, above surface position.

33. An assembly as recited in claim 29 wherein said coupling structure comprises a ball and socket connection.

34. An assembly as recited in claim 29 wherein said seat assembly is connected to said stabilization assembly in a substantially upright position during travel of the marine craft; said upright position at least partially defining said predetermined orientation of said seat assembly and the occupant relative to the marine craft.

35. An assembly as recited in claim 29 wherein said orientation portion further comprises a stabilizing rod moveable relative to said remainder of said stabilization assembly; a suspension assembly disposed and structured to normally maintain said stabilizing rod in a neutral orientation.

36. An assembly as recited in claim 35 wherein said suspension assembly comprises a biasing structure interconnected to said stabilizing rod and disposed in a predetermined array relative thereto.

37. An assembly as recited in claim 36 further comprising a connecting link interconnecting said stabilizing rod to said basing structure, said biasing structure disposed in surrounding relation to said stabilizing rod.

38. An assembly as recited in claim 37 wherein said biasing structure comprises a plurality of biasing segments disposed in a substantially multi-sided array.

39. An assembly as recited in claim 37 wherein said connecting link is normally disposed in substantially aligned relation to a longitudinal axis of the marine craft.

40. An assembly as recited in claim 29 wherein said substantially limited, universal range of movement comprises an outwardly, angularly disposed limit of generally about 30 degrees from a predetermined neutral position.

41. An assembly for safely supporting an occupant within a vehicle, said assembly comprising:
   a) an occupant support securable to the occupant and structured to position the occupant in a predetermined orientation relative to the vehicle,
   b) a platform mounted on the vehicle and interconnected in supporting relation to said occupant support,
   c) a stabilization assembly moveably interconnecting said occupant support to said platform and the vehicle,
   d) said stabilization assembly including a shock absorber portion and an orientation portion,
   e) a coupling structure moveably interconnecting said orientation portion to said shock absorber portion,
   f) said orientation portion moveable relative to said occupant support in response to movement of the vehicle during travel,
   g) said coupling structure and said orientation portion cooperatively structured to restrict movement of said occupant support and the occupant out of said predetermined orientation during travel of the vehicle, and
   h) said movable coupling configured to facilitate movement of said orientation portion throughout a substantially limited, universal range of movement relative to said shock absorber portion and said occupant support.

42. An assembly as recited, in claim 41 wherein said moveable coupling is configured to facilitate movement of said orientation portion throughout a substantially limited, universal range of movement relative to said shock absorber portion and said occupant support.

43. An assembly as recited in claim 41 wherein said orientation portion further comprises a stabilizing rod moveable relative to said shock absorber portion; a suspension assembly disposed and structured to normally maintain said stabilizing rod in a neutral orientation.

44. An assembly as recited in claim 43 wherein said suspension assembly comprises a biasing structure and a connecting link, said connecting link interconnecting said stabilizing rod to said biasing structure and said biasing structure disposed in surrounding relation to said stabilizing rod.

45. An assembly as recited in claim 44 wherein said biasing structure comprises a plurality of biasing segments collectively surrounding said stabilizing rod; said connecting link normally disposed in substantially aligned relation to a longitudinal axis of the vehicle.

46. An assembly as recited in claim 41 further comprising a signaling assembly mounted on said occupant support and disposed and structured to facilitate location of said occupant support.

47. An assembly as recited in claim 46 wherein said signaling assembly comprises a light generating beacon disposed and structured to facilitate visual observation of said occupant support when floating in a body of water.

48. An assembly as recited in claim 46 wherein said signaling assembly comprises transmitter mounted on said occupant support and structured to transmit emergency signals outwardly therefrom.

49. An assembly as recited in claim 46 wherein said signaling assembly comprises a surface finish formed on at least a portion of said occupant support, said surface finish structured to facilitate visual location of said occupant support when floating in a body of water.

50. An assembly as recited in claim 41 wherein said substantially limited, universal range of movement comprises an outwardly, angularly disposed limit of generally about 30 degree from a predetermined neutral position.

* * * * *